United States Patent
Rousseau et al.

(10) Patent No.: US 10,745,568 B2
(45) Date of Patent: Aug. 18, 2020

(54) SURFACE TREATMENT COMPOSITION

(71) Applicant: Atotech Deutschland GmbH, Berlin (DE)

(72) Inventors: Agnes Rousseau, Berlin (DE); Stephen Taylor, Berlin (DE)

(73) Assignee: Atotech Deutschland GmbH, Berlin (DE)

(*) Notice: Subject to any disclaimer, the term of this patent is extended or adjusted under 35 U.S.C. 154(b) by 107 days.

(21) Appl. No.: 15/568,532

(22) PCT Filed: Jun. 1, 2016

(86) PCT No.: PCT/EP2016/062351
§ 371 (c)(1),
(2) Date: Oct. 23, 2017

(87) PCT Pub. No.: WO2016/193291
PCT Pub. Date: Dec. 8, 2016

(65) Prior Publication Data
US 2018/0142104 A1    May 24, 2018

(30) Foreign Application Priority Data
Jun. 3, 2015 (EP) .................................... 15170398

(51) Int. Cl.
| B05D 1/00 | (2006.01) |
| C09D 5/08 | (2006.01) |
| C23C 22/73 | (2006.01) |
| C23C 22/83 | (2006.01) |
| C23C 22/80 | (2006.01) |
| C23C 22/34 | (2006.01) |
| C25D 9/02 | (2006.01) |

(52) U.S. Cl.
CPC ............. *C09D 5/084* (2013.01); *C23C 22/34* (2013.01); *C23C 22/73* (2013.01); *C23C 22/80* (2013.01); *C23C 22/83* (2013.01); *C25D 9/02* (2013.01); *C23C 2222/10* (2013.01)

(58) Field of Classification Search
CPC .................................. B05D 1/00; C09D 5/084
USPC .......................................................... 427/327
See application file for complete search history.

(56) References Cited

U.S. PATENT DOCUMENTS

| 5,391,239 | A | 2/1995 | Boulos |
| 5,759,244 | A | 6/1998 | Tomlinson |
| 6,511,532 | B2 | 1/2003 | Matzdorf et al. |
| 6,562,148 | B1 | 5/2003 | Wendel et al. |
| 7,250,193 | B2 * | 7/2007 | Matsukawa ............. C23C 22/34 |
| | | | 427/388.1 |
| 2011/0206844 | A1 | 8/2011 | Wiles et al. |

FOREIGN PATENT DOCUMENTS

| JP | 2006316334 | 11/2006 |
| TW | 200414937 A | 8/2004 |

OTHER PUBLICATIONS

PCT/EP2016/062351; PCT International Search Report and Written Opinion of the International Searching Authority dated Jul. 21, 2016.
PCT/EP2016/062351; PCT International Preliminary Report on Patentability dated May 16, 2017.
Search Report for ROC(Taiwan) Patent Application No. 105117657 dated Nov. 20, 2019.

* cited by examiner

*Primary Examiner* — Hai Y Zhang
(74) *Attorney, Agent, or Firm* — Renner, Otto, Boisselle & Sklar, LLP

(57) ABSTRACT

The present invention relates to an acidic aqueous composition for treating of zirconium-pretreated metal-based substrate surfaces such as steel metals or aluminium surfaces, a process for treating the substrate surfaces with the composition and the use of the composition as post-treatment of zirconium-pretreated metal-based substrate surfaces for subsequent electrocoating of the surfaces to increase corrosion resistance of said metal-based surfaces prior to electrocoating (e-coat) applications and increases detergent and chemical resistance of treated surfaces used in the white goods industry. The acidic aqueous composition comprises trivalent chromium ions; and hexafluorozirconate ions; characterized in that the source of trivalent chromium ions is a trivalent chromium nitrate salt.

13 Claims, No Drawings

SURFACE TREATMENT COMPOSITION

The present application is a U.S. National Stage Application based on and claiming benefit and priority under 35 U.S.C. § 371 of International Application No. PCT/EP2016/062351, filed 1 Jun. 2016, which in turn claims benefit of and priority to European Application No. 15170398.0 filed 3 Jun. 2015, the entirety of both of which is hereby incorporated herein by reference.

FIELD OF THE INVENTION

The present invention relates to an acidic aqueous composition for treating of zirconium-pretreated metal-based substrate surfaces such as steel metals or aluminium surfaces, a process for treating the substrate surfaces with the composition and the use of the composition as post-treatment of zirconium-pretreated metal-based substrate surfaces for subsequent electrocoating of the surfaces.

The method is particularly suitable to increase corrosion resistance of said metal-based surfaces prior to electrocoating (e-coat) applications used in the white goods industry. The method also increases detergent and chemical resistance of treated surfaces.

BACKGROUND OF THE INVENTION

Various methods for treating of metal-based surfaces, particularly aluminium surfaces, are known in the art.

WO 03/040437 A1 relates to a composition for post-treating anodized aluminium and aluminium alloys to improve the corrosion resistance, abrasion, and adhesion bonding properties of the anodized aluminium and its alloys. The composition comprises an acidic aqueous solution having a pH ranging from about 2.5 to 4.5 containing effective amounts of trivalent chromium salts (sulphate salt), alkali metal hexafluorozirconates, an alkali metal fluoro-compound e.g. fluoroborates and/or fluorosilicates, and effective amounts of water soluble thickeners and surfactants.

WO 2011/106304 A1 discloses a process for passivating a vapor-deposited aluminium layer on a substrate, including providing a substrate comprising vapor deposited aluminium on a surface thereof; treating the surface of the substrate with an aqueous substantially chromium-free composition comprising a hexafluorozirconate.

U.S. Pat. No. 5,391,239 A discloses conversion coatings which can be formed on aluminium substrates by contacting the substrates with an aqueous liquid composition containing adequate free fluoride ion activity and concentrations of dissolved sodium and potassium, if a potassium content in the coating is desired as is usual. The aqueous liquids preferably also contain phosphate and polyhydroxy organic compounds and may contain surfactants if a cleaning effect is desired.

When treating a metal-based surface, particularly a ferrous metals surface, with one of the aforementioned methods, the corrosion resistance is not sufficient. Particularly, when the surface is treated with the aforementioned solutions prior to application of an e-coat, the appearance and durability of the e-coat is unsatisfactory.

OBJECTIVE OF THE PRESENT INVENTION

It is therefore an object of the present invention to provide a composition and a process which improve the corrosion, detergent and chemical resistance of metal-based substrate surfaces, appearance and adhesion bonding properties to subsequently formed layers like the e-coat layers while avoiding the disadvantages of the prior art.

SUMMARY OF THE INVENTION

This objective is solved by an acidic aqueous composition, the use thereof and a process applying such acidic aqueous composition for treating of zirconium-pretreated metal-based substrate surfaces.

The acidic aqueous composition comprises
  a. trivalent chromium ions;
  b. hexafluorozirconate ions;
and is characterized in that the source of trivalent chromium ions is a trivalent chromium nitrate salt.

The process for treating of zirconium-pretreated metal-based substrate surfaces comprises the following steps:
  i. providing a substrate comprising the zirconium-pretreated metal-based surface;
  ii. treating the surface with above acidic aqueous composition which comprises
    a. trivalent chromium ions;
    b. hexafluorozirconate ions;
and is characterized in that the source of trivalent chromium ions is a trivalent chromium nitrate salt.

The use of an acidic aqueous composition comprising
  a. trivalent chromium ions;
  b. hexafluorozirconate ions;
characterized in that the source of trivalent chromium ions is a trivalent chromium nitrate salt, as post-treatment of zirconium-pretreated metal-based substrate surfaces for subsequent electrocoating of the treated surfaces.

To obtain said zirconium-pretreated metal-based substrate surfaces the metal-based substrate surfaces are treated with an aqueous substantially chromium ion-free composition comprising hexafluorozirconate ions. Substantially chromium-free composition within the meaning of this invention means that the composition does not contain a source of chromium ions, and is specifically free of added sources for trivalent and hexavalent chromium ions.

The composition, process and the use according to the invention significantly enhance the performance in view of e-coat coverage and uniformity of electro coating (polymer e-coat). Also the performance of detergent resistance of the paint is improved.

Furthermore the corrosion, detergent and chemical resistance of metal-based surfaces, appearance and adhesion bonding properties to subsequently formed layers like the e-coat layers is improved.

DETAILED DESCRIPTION OF THE INVENTION

Typical parts handled in accordance with the present invention are zirconium-pretreated metal-based substrate surfaces, e.g. ferrous or aluminium, used in the white goods industry. Particularly, the zirconium-pretreated metal-based substrate surfaces are steel surfaces. Often, such surfaces are treated with the composition and process, respectively according to the present invention and subsequently e-coated for final use. This coating requires careful treatment in order to provide the corrosion resistant, optically flawless and defect free white appearance.

E-coatings are well known in the art and applied on a large industrial scale in the manufacture of white goods. E-coats provide the typical look of these goods. E-coating is usually performed by electrolytic deposition of acrylic-based coatings on the substrate surface. Suitable pretreatment of the surface to be coated is essential in order to obtain a durable e-coated surface having a homogeneous thickness distribution of the e-coat.

The process according to the present invention is further suitable for treatment of fasteners such as bolts, screws, nuts, fastening elements of other types like hinges, connectors, hook-type fasteners and the like, and all kinds of hardware, fixtures and fittings, including door, cabinet, kitchen, commercial, industrial and agricultural hardware and fittings. In some applications, a zirconium-pretreated metal-based substrate surfaces can also be the substrate having an aluminium or aluminium alloy surface.

In addition to the foregoing, prior to any of the process steps disclosed with respect to any of the embodiments, the substrates may be cleaned by various known methods. For example, substrates may be degreased, washed, dried, pickled, etc. Pickling may be carried out by any well-known pickling process, such as by using mineral inorganic acids, such as hydrochloric acid, sulfuric acid, nitric acid, and hydrofluoric acid, either individually or as mixtures.

Alternatively or in addition, cleaning can be performed by an alkaline cleaner solution prior to the treatment of the metal-based substrate surfaces to obtain the zirconium-pretreated metal-based substrate surfaces which typically contains about 1 to 5 wt. % of a hydroxide salt, e.g. potassium hydroxide. Such alkaline cleaning solution is particularly suitable to remove oil residuals from preceding stamping treatment (step i0 according to the present invention).

The aqueous substantially chromium ion-free composition for treating of metal-based substrate surfaces to obtain the zirconium-pretreated metal-based substrate surfaces typically has a pH of between 2.0 and 5.50 and more preferably between 4.0 and 5.0.

The source for hexafluorozirconate ions can be provided in either the acid form ($H_2ZrF_6$) or as a salt, in which the cation portion of the hexafluorozirconate salt may be, for example, one or more of ammonium ion, a quaternary ammonium ion, an alkali metal ion, an alkaline earth metal ion or a transition metal ion.

Thus, the hexafluorozirconate in the aqueous substantially chromium ion-free composition is in the form of one or a mixture of any two or more of hexafluorozirconic acid, ammonium hexafluorozirconate, a quaternary ammonium hexafluorozirconate, an alkali metal hexafluorozirconate, an alkaline earth metal hexafluorozirconate, or a transition metal hexafluorozirconate. For convenience, herein the hexafluorozirconate is referred to simply as source of hexafluorozirconate ions, and this is deemed to include the acid form as well as any of the salt forms, unless otherwise specifically identified as the acid form or as one or more specific salt form.

The amount of hexafluorozirconate ions can range between 10 and 10,000 ppm, more preferably between 100 and 5,000 ppm and even more preferably between 200 and 1,000 ppm. The unit ppm within the meaning of this invention means milligrams per liter, i.e. 1 ppm corresponds to 1 mg/L of hexafluorozirconate ions in the aqueous composition. Typically, this step is followed by a rinsing with water, usually de-mineralized water.

In one embodiment, the process for treating of zirconium-pretreated metal-based substrate surfaces according to the present invention therefore comprises the following steps:
i. providing said substrate surfaces;
i0. optionally treating of the metal-based substrate surfaces with an aqueous alkaline solution; optionally followed by rinsing in water;
i1. treating of the metal-based substrate surfaces with an aqueous substantially chromium ion-free composition comprising hexafluorozirconate ions to obtain the zirconium-pretreated metal-based substrate surfaces; optionally followed by rinsing in water;
ii. treating the surfaces with the acidic aqueous composition which comprises
a. trivalent chromium ions;
b. hexafluorozirconate ions;
and is characterized in that the source of trivalent chromium ions is a trivalent chromium nitrate salt.

In a preferred embodiment step i0 is not optionally, means that step i0 is also applied.

The acidic aqueous composition according to the present invention applied in step ii. typically has a pH of between 2.5 and 5.0, preferably between 2.5 and 5.0, and even more preferred between 3.0 and 3.5.

The source of trivalent chromium ions is a trivalent chromium nitrate salt. Chromium nitrate salts comprise chromium, nitrate and varying amounts of water. Most common is the dark violet hydrated solid, e.g. a nonahydrate trivalent chromium nitrate as $Cr(NO_3)_3 \cdot 9H_2O$, but an anhydrous green form is also known, $Cr(NO_3)_3$. These sources are for example suitable to provide trivalent chromium ions for the acidic aqueous composition according to the present invention. The amount of trivalent chromium ions in the acidic aqueous solution can range between 10 and 5.000 ppm, more preferably between 100 and 1.000 ppm and even more preferably between 200 and 500 ppm. The unit ppm within the meaning of this invention means milligrams per liter, i.e. 1 ppm corresponds to 1 mg/L of trivalent chromium ions in the acidic aqueous solution.

It was a surprisingly found that only when using a trivalent chromium nitrate salt as source for trivalent chromium ions, optimum passivation of the zirconium-pretreated metal-based substrate surface can be achieved which provides for the high corrosion resistance, a bright, flawless surface appearance and good adhesion of the subsequently applied e-coat. When applying sulphate or chloride based trivalent chromium salts, the surface appearance is unsatisfactory and the subsequently applied e-coat is nonhomogeneously distributed over the substrate surface. Furthermore, delamination of the e-coat is observed after corrosion testing. This is further illustrated by the examples below.

Generally, application of the acidic aqueous composition according to the present invention results in partial dissolution of the zirconium-pretreated metal-based substrate surface, particularly the ferrous metal-based substrate surface or steel based substrate surface. The surface is then converted into a hydrated oxide, which is tightly attached to metal-based substrate surface and provides an excellent undercoat for subsequent applications like e-coating. For example, when the zirconium-pretreated metal-based substrate surface is a zirconium-pretreated ferrous metal surface like a zirconium-pretreated steel surface, a zirconium-pretreated iron-chromium-zirconium oxide/fluoride species tightly attached to the zirconium-pretreated steel substrate surface is formed from the acidic aqueous composition according to the present invention.

The acidic aqueous composition according to the invention is preferably free from added sulfate ions and chloride ions. Furthermore, the acidic aqueous composition according to the present invention is preferably free from added magnesium ions, nickel ions and zinc ions.

The acidic aqueous composition may be applied to the substrate by any appropriate method, including, for example, spraying, dipping, immersing, barrel treatment in bulk, brushing, wiping or any other suitable process for applying an aqueous liquid to a solid substrate.

The treatment time in step ii. of the present invention may vary. The person skilled in the art will select the best treatment time by routine experiments. Typically, the treatment time ranges between 10 seconds and 10 minutes, more preferably between 20 seconds and three minutes and even more preferably between 30 seconds and 90 seconds.

The temperature of the acidic aqueous solution applied in the process, e.g. by spraying, according to the present invention may vary. Often, it is sufficient to work at ambient temperatures of between 20 and 25° C. Higher temperatures, however, are also possible, e.g. temperatures of up to 40, 60 or 70° C. are suitable.

The source for hexafluorozirconate ions applied in step ii. of the present invention can be provided in either the acid form ($H_2ZrF_6$) or as a salt, in which the cation portion of the hexafluorozirconate salt may be, for example, one or more of ammonium ion, a quaternary ammonium ion, an alkali metal ion, an alkaline earth metal ion or a transition metal ion. Thus, the hexafluorozirconate in the acidic aqueous composition is in the form of one or a mixture of any two or more of hexafluorozirconic acid, ammonium hexafluorozirconate, a quaternary ammonium hexafluorozirconate, an alkali metal hexafluorozirconate, an alkaline earth metal hexafluorozirconate, or a transition metal hexafluorozirconate. For convenience, herein the hexafluorozirconate is referred to simply as source of hexafluorozirconate ions, and this is deemed to include the acid form as well as any of the salt forms, unless otherwise specifically identified as the acid form or as one or more specific salt form. The amount of hexafluorozirconate ions can range between 10 and 10,000 ppm, more preferably between 100 and 5,000 ppm and even more preferably between 200 and 1,000 ppm. The unit ppm within the meaning of this invention means milligrams per liter, i.e. 1 ppm corresponds to 1 mg/L of hexafluorozirconate ions in the aqueous solution.

Thereafter, it is recommended to rinse the treated metal based-substrate surfaces with water, with deionized DI water being particularly preferred. Without sufficient rinsing, residuals of the acidic aqueous composition may remain on the surface, which negatively affect further treatment, e.g. application of an e-coat.

EXAMPLES

The following examples illustrate the benefits of the acidic aqueous composition and process according to the present invention.

The substrates for these tests used were 4"×12" (10.24 cm×30.48 cm) steel panels.

TABLE 1

Process Cycle according to the Examples

| Stage | Steel Substrate (panel) | Contact time (s) |
| --- | --- | --- |
| Clean (step i0.) | 5 wt. % KOH (aqueous), 55° C. | 80 |
| Rinse | DI water | 40 |
| Step i1. | pH = 4.5-4.8, 20° C. Solution A (below) | 90 |
| Rinse | DI water | 2-5 |
| Step ii. | Acidic aqueous composition according to the invention Solution B (below)/ Solutions C and D (both comparative) | 25 |
| Rinse | DI Water | 55 |
| Dry | Dry panel at 100° C. | 15 minutes |

Solution A (step i1.)—Aqueous substantially trivalent chromium ion-free composition, used in all Examples 1 to 3.

$(NH_4)_2ZrF_6$ 5.0 g/l in water

Example 1: Solution B (Step ii.)—Acidic Aqueous Composition According to the Present Invention $(NH_4)_2ZrF_6$ 5.0 g/l in water
$Cr(NO_3)_3.9H_2O$ 3.5 g/l in water (8.75 mmol/l Cr(III) ions)

Example 2: Solution C (Step ii.)—Trivalent Chromium Chloride (Comparative)

$(NH_4)_2ZrF_6$ 5.0 g/l in water
$CrCl_3.6H_2O$ 2.3 g/l in water (8.75 mmol/l Cr(III) ions)

Example 3: Solution D (Step ii.)—Trivalent Chromium Sulphate (Comparative)

$(NH_4)_2ZrF_6$ 5.0 g/l in water
$Cr_2(SO_4)_3.H_2O$ 3.5 g/l in water (8.75 mmol/l Cr(III) ions)

After the substrates were treated in the above solutions according to Table 1 they were subsequently painted with an acrylic based commercial organic coating (e-coat as used in the white goods industry). The corrosion and detergent immersion resistances were respectively tested using ASTM B117 (version 11 2011) and ASTM D 2248 (version 01a 2007). Unless otherwise stated, the experimental conditions were according to the recommendations of the ASTM specifications. For ASTM D2248, the detergent solution according to number 7.2 was selected.

Before testing the painted panels were scribed as per ASTM 1654 (version—05 2005). The Rating of Failure of Scribe was measured according to Section 7. and Table 1 of D1654-05.

TABLE 2

Measurement: ASTM D1654-05 - Detergent immersion resistance (D2248-01a) - 100 h at 74° C.

| | Mean Creepage (Table 1 of D1654-05) | Rating according to ASTM D 1654-05 |
| --- | --- | --- |
| Example 1 | 0-1.5 | 10-7 |
| Example 2 | 1.5-3 | 7-6 |
| Example 3 | 4-10 | 5-4 |

TABLE 3

Measurement: ASTM D1654-05 - Neutral Salt Spray resistance - 1000 h in cabinet (ASTM B117-11)

| | Mean Creepage (Table 1 of D1654-05) | Rating according to ASTM D 1654-05 |
| --- | --- | --- |
| Example 1 | 0-2 | 10-7 |
| Example 2 | 0-2 | 10-7 |
| Example 3 | 3-5 | 6-5 |

TABLE 4

| | E-coat coverage |
|---|---|
| | Thickness uniformity*, Δ (μm) |
| Example 1 | 2-3 |
| Example 2 | 7-8 |

*maximum difference of e-coat thickness on one part at various locations As shown by the foregoing examples, when using a trivalent chromium nitrate salt as the source of trivalent chromium ions (Example 1) superior detergent immersion resistance and corrosion protection as compared to the comparative Examples (Examples 2 and 3) could be obtained. Table 2 shows the detergent immersion resistance after 100 hours at 74° C. As becomes apparent, the Example 1 according to the present invention has the lowest adhesion loss and the highest rating according to ASTM D 1654-05 when compared to the comparative Examples 2 and 3.

Also, the corrosion resistance as measured by the Neutral Salt Spray Test (Table 3) was best according to the rating according to ASTM D 1654-05 (right column) for Example 1 when compared to the comparative Examples 2 and 3. Example 1 according to the present invention additionally showed the lowest adhesion loss (Table 2).

Table 4 establishes that the thickness uniformity of the e-coat when applied to a surface treated with the method according to the present invention (Example 1) was very homogeneous when compared to comparative Examples 2 and 3.

While the principles of the invention have been explained in relation to certain particular embodiments, and are provided for purposes of illustration, it is to be understood that various modifications thereof will become apparent to those skilled in the art upon reading the specification. Therefore, it is to be understood that the invention disclosed herein is intended to cover such modifications as fall within the scope of the appended claims. The scope of the invention is limited only by the scope of the claims.

The invention claimed is:

1. A process for treating of zirconium-pretreated metal-based substrate surfaces, comprising: i providing a zirconium-pretreated metal-based substrate; and ii. applying to surfaces of the substrate an acidic aqueous composition comprising: a. trivalent chromium ions; and b. hexafluorozirconate ions; characterized in that the sole source of the trivalent chromium ions is a trivalent chromium nitrate salt.

2. The process according to claim 1 wherein the concentration of trivalent chromium ions ranges between 10 and 5,000 mg/L.

3. The process according to claim 1 wherein the zirconium-pretreated metal-based substrate surfaces are obtained by pretreating with an aqueous chromium ion-free composition comprising hexafluorozirconate ions.

4. The process according to claim 1 wherein the trivalent chromium nitrate salt is $Cr(NO_3)_3$ or $Cr(NO_3)_3 \cdot 9\ H_2O$.

5. The process according to claim 1 wherein the concentration of hexafluorozirconate ions independently ranges between 10 and 10,000 mg/L.

6. The process according to claim 1 wherein the source of hexafluorozirconate ions independently is selected from the group consisting of hexafluorozirconic acid, ammonium hexafluorozirconate, an alkali metal hexafluorozirconate, an alkaline earth metal hexafluorozirconate and a transition metal hexafluorozirconate.

7. The process according to claim 1 wherein a pH value of the acidic aqueous composition ranges between 2.0 and 5.5.

8. The process according to claim 1 wherein the acidic aqueous composition is free from added sulfate ions and chloride ions.

9. The process according to claim 1 wherein the acidic aqueous composition is free from added magnesium ions, nickel ions and zinc ions.

10. The process according to claim 1 wherein the zirconium-pretreated metal-based substrate surfaces are zirconium-pretreated steel substrate surfaces or zirconium-pretreated aluminum substrate surfaces or zirconium-pretreated aluminum alloy substrate surfaces.

11. The process according to claim 1 wherein the treating according to step ii. is by spraying the acidic aqueous composition onto the zirconium-pretreated metal-based substrate surfaces at a temperature of between 20 to 25° C.

12. The process according to claim 1 wherein the zirconium-pretreated metal-based substrate surfaces are derived by step i1, treating the metal-based substrate surfaces with an aqueous chromium ion-free composition comprising hexafluorozirconate ions to obtain said zirconium-pretreated metal-based substrate surfaces prior to step ii.

13. The process according to claim 12 wherein the aqueous chromium ion-free composition according to step i1 has a pH of between 4.0 and 5.0 and a concentration of hexafluorozirconate ions between 100 and 5,000 mg/L.

* * * * *